United States Patent Office 3,763,102
Patented Oct. 2, 1973

3,763,102
PRODUCTION OF MOLDINGS AND COATINGS BY THE REACTION OF A POLYEPOXIDE AND A POLYAMINE
Herwig Hoffmann, Frankenthal, Oskar Lissner, Bad Duerkheim, Karl Merkel, Ludwigshafen, and Heinrich Scholz, Heidelberg, Germany, assignors to Badische Anilin- & Soda-Fabrik Aktiengesellschaft, Ludwigshafen (Rhine), Germany
No Drawing. Filed May 3, 1972, Ser. No. 249,766
Int. Cl. C08g 30/14
U.S. Cl. 260—47 EN                5 Claims

ABSTRACT OF THE DISCLOSURE

Production of moldings or coatings by reaction of a polyepoxide compound with a polyamine of the general formula:

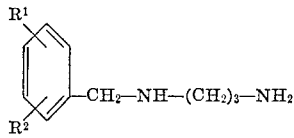

in which $R^1$ and $R^2$ may be identical or different and are hydrogen, alkyl of one to eight carbon atoms, or cycloalkyl or aryl of up to twelve carbon atoms, in the presence or absence of conventional additives.

---

It is known that polyepoxides can be hardened with aliphatic and cycloalipahtic polyamines.

The amino groups of the polyamines react in known manner with the epoxide groups of polyepoxides to form long chain molecules with the formation of high molecular weight polyoxyamines.

The polyepoxides are liquid at normal temperature or, in the case of higher degrees of condensation, solid.

Hitherto solid polyepoxides have mainly been used in practice. These can however only be used in the form of solutions, for example in xylene or butanol, because of their state of aggregation.

It is a disadvantage of solvent-containing mixtures of solid epoxide resins with polyamines that in the production of moldings by the curing process considerable amounts of occluded solvent may be retained in the end product which impair the properties of the molding. This disadvantage also applies in the production of surface coatings.

Liquid polyepoxides capable of being poured or cast are of particular practical interest because in combination with suitable polyamines which are also liquid, solvent-free surface coatings and casting materials can be prepared. The hardening reaction which occurs by polyaddition at room temperature makes it possible to obtain single layer coatings devoid of pores and also pourable sealing compounds without shrinkage because volatile cleavage products are not formed during the hardening. The use of liquid purely aliphatic polyamines as hardening components has the disadvantage that the reaction mixture has too short a pot life and does not dry free from haze. Thus with combinations of low molecular weight polyepoxides and aliphatic polyamines, mixtures are obtained which char after being left for only one minute to two minutes at room temperature and which therefore cannot be processed without the use of solvents. Better results have been obtained with cycloaliphatic polyamines whose amino groups are situated on one or a plurality of cycloaliphatic radicals combined together such as diaminocyclohexane, diaminodicyclohexylmethane and the like (German Pat. 1,122,195 and U.S. Pat. 2,981,711) or with aliphatic polyamines which contain at least one cycloaliphatic radical attached to nitrogen, for example N-cyclohexylpropylenediamine-(1,3) (German Pat. 1,019,461). Although reaction mixtures having pot lives of practical utility and also films devoid of turbidity are obtained with these polyamines provided drying is carried out at temperatures above 25° C., the coatings and casting materials obtained remain tacky too long at low temperatures, and they are moreover brittle and disintegrate in the flexural test. With aromatic liquid polyepoxides, no elasticity is obtained upon heating to 80° C.

Aromatic polyamines alone are entirely unsuitable as hardening components for polyepoxides. They are usually in solid form, are dark in color, yellow considerably, and coatings prepared therewith harden much too slowly at temperatures below 80° C.

It is the object of the present invention to provide a process for the production of moldings and coatings of polyepoxides and polyamines in which the abovementioned disadvantages are obviated and the mixtures of polyepoxide and polyamine have processing times of adequate length and harden thoroughly at low temperatures rapidly to give high gloss, haze-free, hard and elastic coatings or moldings.

It is an object of the present invention to provide a process for the production of moldings and coatings by reaction of polyepoxide compounds with certain polyamines containing primary and secondary amino groups.

This and other objects and advantages of the invention are achieved by a process for the production of moldings or coatings by reaction of a polyepoxide compound with a polyamine containing primary and secondary amino groups, in the presence or absence of conventional additives, which comprises using, as the polyamine, one which has the general formula:

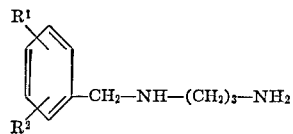

in which $R^1$ and $R^2$ are identical or different and each is hydrogen, alkyl of one to eight carbon atoms, or cycloalkyl or aryl of up to twelve carbon atoms.

We have found that it is particularly advantageous to use, as the amine hardener, a N-(methylbenzyl)-1,3-propylenediamine in which the methyl group may be in ortho-, meta- or para-position, or a mixture of the isomers.

We have further found that it is particularly advantageous to use a liquid polyepoxide based on bisphenol A or a chlorinated derivative thereof and epichlorohydrin.

All products containing more than one epoxide group in the molecule are suitable as polyepoxides, in particular aromatic diglycidyl ethers, e.g. condensation products of polyhydric phenols such as 4,4'-dihydroxydiphenyl-2,2-propane and epichlorohydrin and also aliphatic polyglycidyl ethers of polyhydric alcohols such as butanetriol, glycerol, pentaerythritol and the like and epichlorohydrin. The polyglycidyl ethers containing more than one epoxide group in the molecule are liquids or pulverizable solids according to the molecular weight. Aromatic low molecular weight diepoxides are of medium to high viscosity whereas aliphatic polyepoxides are usually of low to medium viscosity.

Liquid polyepoxides which have been prepared from 4,4'-dihydroxydiphenyl-2,2-propane and epichlorohydrin are preferentially suitable for the process according to the invention.

The following are suitable examples of amines of the general formula:

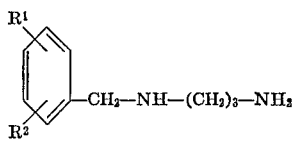

in which $R^1$ and $R^2$ are identical or different and each is hydrogen, alkyl of one to eight carbon atoms, or cycloalkyl or aryl of up to twelve carbon atoms:

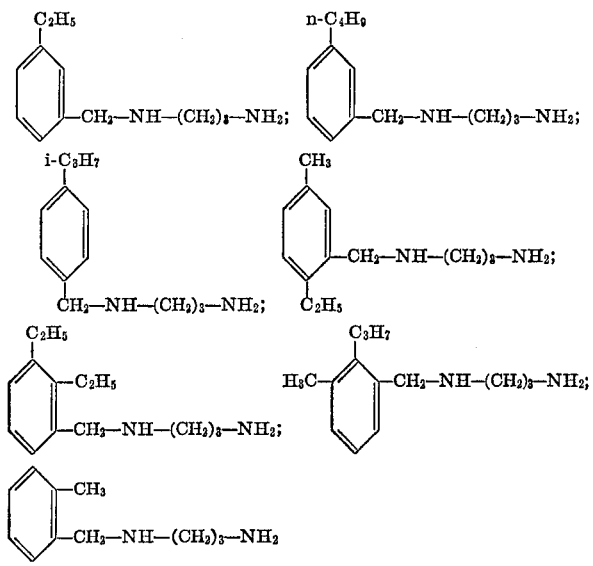

The production of these amines may for example be carried out conveniently by the following methods:

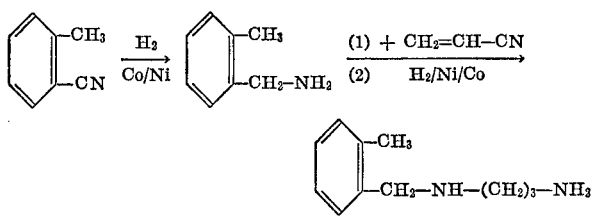

For the preparation of moldings or coating compositions, the polyepoxides are generally mixed with the polyamines so that for each epoxide group there is one amine hydrogen. Up to about 20% molar more or less than this amount of hardener may however be used. An excess of even up to 100% molar of hardener may be used for the production of elastic products.

The reaction mixture may if desired also contain other, conventional, additives, for axample:

(a) a solvent, as for example xylene, n-butanol, benzyl alcohol, 2-ethylhexanol, a mixture of isomeric nonyl alcohols, ethylene glycol, an alkyl glycol ether or a mixture of these solvents;
(b) a plasticizer, as for example a dialkyl phthalate, monoalkyl maleate or dialkyl maleate;
(c) a phenol such as phenol, a cresol, n-butylphenol, isomers of nonylphenol, diisopropylphenol, salicylic acid, hydroquinone or resorcinol;
(d) a levelling agent such as a phenol-formaldehyde resin, an aminoplast resin, as for example a melamine-formaldehyde or urea-formaldehyde resin, or a silicone oil;
(e) an inorganic and/or organic pigment, as for example $TiO_2$ or an iron oxide pigment;
(f) a catalyst for accelerating the hardening process such as boron trifluoride complex compound, tertiary amine, aminophenol, alkyltin or alkylaluminum compound;
(g) another aliphatic, cycloaliphatic or aromatic polyamine which does not unfavorably affect the properties of the end product, as for example nonadecanediamine, dipropylenetriamine, N-aminopropylcyclohexylamine, 4,4' - diaminodicyclohexylmethane, 4,4' - diaminodiphenylmethane, isophoronediamine or 1,6-hexamethylenediamine; or
(h) dyes.

Mixtures prepared with polyepoxides and the above polyamines can be processed at room temperature for an adequate period and the coatings and casting materials harden rapidly even at low temperatures. They are of high gloss, haze-free, particularly resistant to impact, hard and elastic. In combination with aromatic liquid diepoxides it is possible to obtain even without using solvents, coatings which are tackfree after only thirty hours at 0° C. and which acquire high elasticity after heating to 60° C. The films are pale in color and have good fastness to light. They also have good resistance to aging, resistance to water and chemical stability to salts, alkalies and weak acids.

Since the products are liquid and generally colorless, not only may high molecular weight polyepoxides in the form of solutions be hardened therewith, but solvent-free sprayable or spreadable, pourable reaction mixtures may be prepared by including low molecular weight polyepoxides. The reaction mixtures may be applied to metallic substrates, concrete, asbestos cement, wood and the like and at room temperature give pale, hard and elastic coatings having good adhesion and good chemical resistance.

The polyamines claimed according to the invention are also suitable in an outstanding manner for hardening solid epoxide resins without the need for reworking them.

The following examples illustrate the invention, in Example 1 and comparative Examples (a) to (e) the criteria of test methods A to D are used for the finished coatings.

(1) TEST A

Erichsen number (a measure of the elasticity of the film). The mixture of polyepoxide and amine is applied in a layer of a certain thickness to deep drawing steel sheet having a thickness of 1 mm. and an area of 25 cm. x 5 cm. After the hardening process is over, a steel ball having a diameter of 15 mm. is pressed into the sheet on the reverse side and the depth of penetration in mm. at which the coating begins to crack is determined.

Assessment

Erichsen number=0 to 2 mm.—rating 6=inadequate
Erichsen number=6 to 8 mm.—rating 2=good
Erichsen number=9 to 12 mm.—rating 1=very good.

(2) TEST B

Hardness of the film using König pendulum hardness tester according to DIN standard specification 53,157. Polyepoxide-polyamine mixtures applied as in test A to a steel sheet.

Assessment pendulum hardness=20 seconds—rating 6=inadequate
pendulum hardness=80 to 140 seconds—rating 2=good
pendulum hardness=150 seconds—rating 1=very good.

(3) TEST C

Subjective assessment of the coating based on art-established principles. The polyepoxide-polyamine mixture is applied to a sheet of glass having an area of 25 cm. x 6 cm.

Assessment film completely clear, unobjectionable—rating 1=very good film with craters and/or turbidity, blisters, flow defects—ratings 2 to 6=good to inadequate depending on the intensity of the surface faults.

(4) TEST D

Measurement of the drying time of the film, beginning with the time at which the polyepoxide-polyamine mixture is applied, with an automatic sanding apparatus at 20° C. The polyepoxide-polyamine mixture is applied to a sheet of glass having an area of 25 cm. x 6 cm.

The following measurements are made:

(a) time until the film is free from tackiness:
assessment=maximum of 2 to 3 hours is good.
(b) time until the film has completely dried:
assessment=maximum of 10 to 12 hours is good.

The parts and percentages specified in the examples are by weight.

EXAMPLE 1

100 g. of liquid polyepoxide resin having an epoxide number of 0.5 and prepared from 1 mole of 4,4'-dioxydiphenylpropane and 2 moles of epichlorohydrin (for example Epikote 828 of Shell) is mixed with 30 g. of the amine hardener N - (2 - methylbenzyl)-1,3-propylenediamine having an H-equivalent weight of 59. The homogeneous liquid mixture is applied immediately to sheet steel and to a sheet of glass each having an area of 25 cm. x 6 cm. Test methods A to D are then carried out. The results are given in Table 1.

Comparative experiment (a)

The procedure is the same as in Example 1 but 30 g. of 3,3'-diaminodicyclohexyldimethylmethane is used as amine hardener. H-equivalent weight=60. For results see Table 1.

Comparative experiment (b)

The procedure is exactly the same as in Example 1 except that 37 g. of nonadecanediamine isomer mixture is used as the amine hardener. H-equivalent weight=74. For results see Table 1.

Comparative experiment (c)

The exact procedure of Example 1 is followed but 10.3 g. of diethylenetriamine is used as the amine hardener. H-equivalent weight=20.5. For results see Table 1.

Comparative experiment (d)

Exactly the same procedure is used as in Example 1 but 26 g. of N-(3-aminopropyl)-cyclohexylamine is used as the amine hardener. H-equivalent weight=52. For results see Table 1.

Comparative experiment (e)

The procedure followed is exactly the same as in Example 1 with the exception that 21.5 g. of 4-(t-butyl)-hexamethylenediamine-(1,6) is used as the amine hardener. H-equivalent=43. For results see Table 1.

The following abbreviations are used in Table 1:

Ex 1=Example 1
(a)–(e)=Comparative experiments (a) to (e)
A–D=Test methods A to D
st=sticks
c=clear
h=hazed
m=matt
t=turbid
Film=film appearance;
Eval=evaluation of the coating as a whole.

TABLE 1

| | Ex 1 | (a) | (b) | (c) | (d) | (e) |
|---|---|---|---|---|---|---|
| A— | | | | | | |
| Mm | 10 | 0.8 | st | 0.5 | 0.6 | 0.3 |
| Rating | 1 | 6 | 6 | 6 | 6 | 6 |
| B— | | | | | | |
| Seconds | 178 | 230 | st | 190 | 200 | st |
| Rating | 1 | 1 | 6 | 1 | 1 | 6 |
| C— | | | | | | |
| Film | c | c | h | mh | th | th |
| Rating | 1 | 1 | 5 | 6 | 5 | 6 |
| D— | | | | | | |
| (a) Hours | 4.5 | 3.5 | 24 | 3 | 24 | 24 |
| (b) Hours | 7 | 10.5 | 24 | 8 | 24 | 24 |
| Rating | 2 | 2 | 5 | 2 | 5 | 6 |
| Eval | 1 | 3–4 | 5 | 4 | 4 | 6 |

EXAMPLE 2

30 parts by weight of N-(2-methylbenzyl)-propylenediamine-(1,3) is stirred well into 100 parts by weight of a liquid diepoxide prepared from 1 mole of 4,4'-dioxydiphenylpropane and 2 moles of epichlorohyrin having an epoxide number of 0.5 (the epoxide number is the number of gram molecules of epoxide groups contained in 100 g. of polyepoxide) and the reaction mixture, which has a pot life of six hours at 20° C., is applied to sheet glass and sheet iron in a layer having a thickness of 100 microns. The coating is tackfree after only four hours at 23° C. and is completely hardened after eight hours. It is clear and resistant to the action of mineral oils, caustic soda solution and the like. The surface hardness (pendulum tester according to König) is 206 seconds after having been kept for two days at room temperature and after heating for fifteen hours at 60° C. a coating is obtained having a surface hardness of 205 seconds and an Erichsen depression number of 9.4 mm. The same coating hardens tackfree and clear after only twenty-six hours at 0° C.

When equivalent amounts of purely aliphatic polyamines such as ethylene diamine, propylene diamine, diethylene triamine and the like are used, mixtures are obtained which char after a few minutes under the same conditions. The coatings obtained remain turbid and brittle even after having been heated for fifteen hours at 60° C.

The same experiment is carried out with N-cyclohexylpropylene diamine. Coatings are obtained which harden completely more slowly and have higher brittleness. The Erichsen number after aging for fifteen hours at 60° C. is only 0.9 mm. Freedom from tackiness could not be achieved at 0° C. after ninety-six hours. Dimethyldiaminodicyclohexylmethane as hardening component gives with the same method reaction mixtures having a pot life of eleven hours and an equally good hardening at 20° to 23° C. At 0° C. the coating does not become tackfree until after forty hours. It exhibits honeycomb structure and crack formation on the surface and poor levelling. The films remain very brittle (Erichsen number 0.8) even after having been aged for fifteen hours at 60° C.

EXAMPLE 3

An equivalent amount of (a) N-benzylpropylenediamine and (b) N-cyclohexylpropylenediamine is added to a 40% solution of a diepoxide from 4,4-diphenylolpropane and epichlorohydrin having an epoxide number of 0.2 in a solvent mixture of methyl isobutyl ketone, ethyl glycol and xylene (1:1:1) which also contains 5% of a urea-formaldehyde resin (60%) in butanol as levelling agent.

The pot life of the coating is five days in the case of (a) and six days in the case of (b). The coatings in both cases are tackfree after one hour at 23° C., but (a) is completely hardened after only seven hours while (b) is not completely hardened until after ten hours. At 0° C. film (a) is tackfree after 20 hours while film (b) is not entirely tackfree after 40 hours. The coatings in both cases are clear, hard and elastic.

When propylenediamine is used under the same test conditions, turbid films are always obtained.

EXAMPLE 4

59 parts of a mixture of equal parts of N-(2-methylbenzyl)propylenediamine and p-nonylphenol is stirred into 100 parts of a liquid diepoxide from 4,4-diphenylolpropane and epichlorohydrin having an epoxide number of 0.52. The pot life of the pouring material is about sixty minutes at 23° C. The material poured out is tack-free after 3½ hours and nail hard after 5½ hours. Freedom from tackiness is achieved after twenty-four hours at 0° C. The coatings are clear and glossy and after being kept for two days at room temperature have a pendulum hardness according to König of 168 seconds and a depression number in the Erichsen equipment of 9.9 mm. which during exposure to a temperature of 60° C. for twenty-four hours falls to 9.5 mm.

Hardened castings are resistant to dilute acids and alkalies.

We claim:

1. A process for the production of moldings or coatings by reaction of condensation products of polyhydric phenols and epichlorohydrin or polyhydric alcohols and epichlorohydrin, said condensation products containing more than one epoxide group in the molecule with polyamines containing primary and secondary amino groups which comprises using as the polyamine one having the general formula:

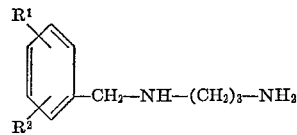

in which $R^1$ ad $R^2$ are identical or different and are hydrogen or alkyl of one to eight carbon atoms.

2. A process as claimed in claim 1 wherein N-(methylbenzyl)-1,3-propylenediamine is used as polyamine.

3. A process as claimed in claim 2 wherein N-(methylbenzyl)-1,3-propylenediamine is used as polyamine.

4. A process as claimed in claim 1 wherein a liquid polyepoxide based on 4,4'-dihydroxydiphenyl-2,2-propane or a chlorinated derivative thereof and epichlorohydrin is used as the polyepoxide compound.

5. A process as claimed in claim 1 wherein the polyepoxide is used with the polyamine in the ratio of 0.8 to 1.2 epoxide groups to 0.8 to 2.0 amine hydrogens.

References Cited

UNITED STATES PATENTS 2,880,194   3/1959   Glaser _____ 260—47
3,444,201   5/1969   Ham et al. _____ 260—47 XR HAROLD D. ANDERSON, Primary Examiner T. E. PERTILLA, Assistant Examiner U.S. Cl. X.R.

260—2 N, 2 EC, 47 EC

UNITED STATES PATENT OFFICE
CERTIFICATE OF CORRECTION

Patent No. 3,763,102           Dated October 2, 1973

Inventor(s) Herwig Hoffmann et al

It is certified that error appears in the above-identified patent and that said Letters Patent are hereby corrected as shown below:

First page, Column 1, tenth line, insert
-- [30] Foreign Application Priority Data
    May 12, 1971      Germany . . . . . P 21 23 564.3 --.

Column 1, line 31, "cycloalipahtic" should read
-- cycloalipathic --.

Column 3, lines 15-20, right-hand formula,

" 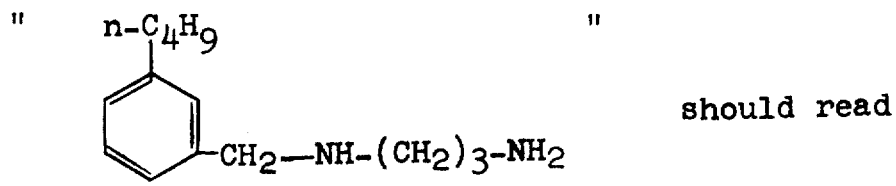   "    should read

-- 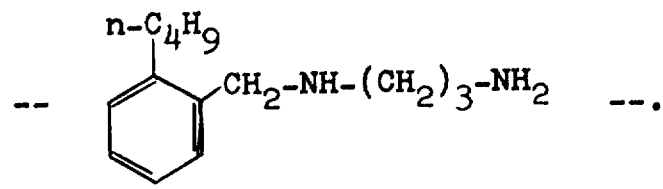  --.

Column 3, line 59, "axample" should read -- examples --.

Column 4, line 37, "in" should start a new sentence.

Column 8, line 7, "ad" should read -- and --.

Signed and sealed this 5th day of November 1974.

(SEAL)
Attest:

McCOY M. GIBSON JR.          C. MARSHALL DANN
Attesting Officer            Commissioner of Patents